US010716650B2

(12) United States Patent
Hermansen

(10) Patent No.: US 10,716,650 B2
(45) Date of Patent: Jul. 21, 2020

(54) DENTAL FLOSS HOLDER

(71) Applicant: STAR FLOSS AS, Oslo (NO)

(72) Inventor: Kevin Hermansen, Oslo (NO)

(73) Assignee: STAR FLOSS AS, Oslo (NO)

(*) Notice: Subject to any disclaimer, the term of this patent is extended or adjusted under 35 U.S.C. 154(b) by 408 days.

(21) Appl. No.: 15/321,059

(22) PCT Filed: Jun. 23, 2015

(86) PCT No.: PCT/EP2015/064111
§ 371 (c)(1),
(2) Date: Dec. 21, 2016

(87) PCT Pub. No.: WO2015/197616
PCT Pub. Date: Dec. 30, 2015

(65) Prior Publication Data
US 2017/0151043 A1 Jun. 1, 2017

(30) Foreign Application Priority Data
Jun. 24, 2014 (NO) .................................. 20140804

(51) Int. Cl.
A61C 15/04 (2006.01)
A61C 17/22 (2006.01)

(52) U.S. Cl.
CPC .......... A61C 15/046 (2013.01); A61C 17/228 (2013.01)

(58) Field of Classification Search
CPC .................... A61C 15/046; A61C 17/228
See application file for complete search history.

(56) References Cited

U.S. PATENT DOCUMENTS

| 1,091,789 A * | 3/1914 | Andres | A61C 15/046 132/323 |
| 2,172,998 A | 9/1939 | Grout et al. | |
| 2,180,522 A | 11/1939 | Henne | |
| 3,106,216 A | 10/1963 | Kirby | |
| 3,231,925 A | 2/1966 | Conder | |
| 4,404,978 A | 9/1983 | Withers | |

(Continued)

FOREIGN PATENT DOCUMENTS

| CN | 201 200 488 Y | 3/2009 |
| NL | 7 810 061 A | 4/1979 |
| WO | 2014/016834 A1 | 1/2014 |

OTHER PUBLICATIONS

International Search Report issued in PCT/EP2015/064111 dated Aug. 25, 2015 (3 pages).

(Continued)

Primary Examiner — Cris L. Rodriguez
Assistant Examiner — Brianne Kalach
(74) Attorney, Agent, or Firm — Osha Liang LLP

(57) ABSTRACT

A dental floss holder includes a connecting section and at least four floss supporting arms extending from said connecting section. Each of the floss supporting arms has a first end and a second end. The first end is connected to the connecting section, and the second end includes a floss fastening portion for fastening a string of dental floss. The floss fastening portions of the at least four floss supporting arms are configured such that a string of dental floss attached to the floss fastening portions of the at least four floss supporting arms may be arranged to constitute the edges of a polyhedron.

15 Claims, 5 Drawing Sheets

(56) References Cited

U.S. PATENT DOCUMENTS

| | | | |
|---|---|---|---|
| 4,440,184 A | 4/1984 | Smith | |
| 5,190,062 A | 3/1993 | Rafaeli | |
| 5,433,227 A * | 7/1995 | Chen ................. | A61C 15/046 132/323 |
| 6,257,252 B1 * | 7/2001 | Hall .................... | A61C 15/046 132/323 |
| 7,220,123 B1 | 5/2007 | Karapetyan | |
| 2008/0163888 A1 * | 7/2008 | Chen ................. | A61C 15/046 132/323 |
| 2012/0234350 A1 | 9/2012 | Mowell et al. | |
| 2013/0220356 A1 | 8/2013 | Sahoo | |

OTHER PUBLICATIONS

Written Opinion of the International Searching Authority issued in PCT/EP2015/064111 dated Aug. 25, 2015 (5 pages).
Norwegian Search Report issued in Patent Application No. 20140804 dated Feb. 2, 2015 (2 pages).

\* cited by examiner

DENTAL FLOSS HOLDER

FIELD OF THE INVENTION

The present invention concerns a dental floss holder, and more particularly a dental floss holder not requiring the use of hands for flossing.

BACKGROUND

In the prior art, dental flossing requires the use of fingers to hold the dental floss, and/or a device comprising a dental floss holder and a handle for guiding the dental floss holder in the mouth of a user. A common problem or disadvantage connected with prior art methods of dental flossing is that the person flossing have to use one or both of his hands, and is thus prevented from performing other tasks, such as driving, while flossing. A further potential disadvantage is that the flossing is done with the mouth at least partially open, and this may in some settings be socially unacceptable.

Examples of typical prior art dental floss holders requiring a handle for guiding the dental floss holder in the mouth of a user are disclosed in U.S. Pat. Nos. 4,404,978 and 3,106,216.

An example of a replaceable dental floss holder for attachment to a separate handle for guiding the dental floss holder in the mouth of a user is disclosed in U.S. Pat. No. 2,180,522.

A goal of one or more embodiments of the present invention is to provide a dental floss holder which alleviates or avoids at least some of the issues contributing to a non-regular or lacking use of dental floss.

SUMMARY OF THE INVENTION

One or more embodiments of present invention provide a dental floss holder that does not require the use of a handle, or fingers, to guide the dental floss in the mouth of a user. The floss holder according to one or more embodiments of the invention is defined by the appended claims and in the following:

In one embodiment, the present invention provides a dental floss holder comprising a connecting section, and at least four floss supporting arms extending from said connecting section, each of the floss supporting arms has a first end and a second end, the first end is connected to, or is a part of, the connecting section, and the second end comprises a floss fastening portion for fastening a string of dental floss, wherein a string of dental floss attached to the floss fastening portions of the at least four floss supporting arms may be arranged to constitute the edges of a polyhedron.

The floss fastening portions are spaced apart such that a string, or strings, of dental floss may be fastened between at least three of said floss supporting arms before use. The string of dental floss between two floss supporting arms having a length making it suitable for being moved between adjacent teeth.

The connecting section may also be termed a hub, i.e. a body or member comprised by, or connected to, the first ends of the floss supporting arms.

In another embodiment of the dental floss holder according to the invention, each of the floss supporting arms are connected to each of at least two, preferably at least three, neighboring floss supporting arms by a string of dental floss attached to the floss fastening portions of the floss supporting arms.

In another embodiment of the dental floss holder according to the invention, the string of dental floss is spaced apart from the connecting section.

In another embodiment of the dental floss holder according to the invention, the second end of the floss supporting arms comprises a rounded surface. The rounded surface ensures that the dental floss holder is comfortable to have in the mouth by avoiding any sharp edges which may hurt or scratch the gums or palate.

In another embodiment of the dental floss holder according to the invention, the multiple strings of dental floss connecting the at least four floss supporting arms are arranged to constitute at least some of the edges of a polyhedron, such as a tetrahedron, a cube, an octahedron, a hexagonal prism and similar.

In another embodiment of the dental floss holder according to the invention, the connecting section is arranged within a volume delimited by the polyhedron formed by the multiple strings of dental floss.

In another embodiment of the dental floss holder according to the invention, the floss supporting arms are of a substantially equal length.

In another embodiment of the dental floss holder according to the invention, the string of dental floss is fastened to the fastening portion by any suitable means, such as by molding, melting, embedding, gluing, winding, tying or clamping.

In another embodiment of the dental floss holder according to the invention, the holder is manufactured as one integrated unit by molding.

In another embodiment of the dental floss holder according to the invention, at least two strings of dental floss are aligned and arranged on opposite sides of the connecting section.

In another embodiment of the dental floss holder according to the invention, the floss supporting arms are joined together by a strengthening section.

In another embodiment of the dental floss holder according to the invention, the floss supporting arms extends from the connecting section to form a polygonal base of a polyhedron where the strings of dental floss form the faces of the polyhedron.

For all embodiments, the distance between a string of dental floss and an outer surface of the connecting section should preferably be sufficient to allow the string of dental floss to pass between two adjacent teeth and touch the upper surface of the gum between said teeth.

In another embodiment of the dental floss holder according to the invention, the strengthening section comprises a compressible material arranged in the space between the strings of dental floss, the floss supporting arms and the connecting section, such that the compressible material will help to push the strings of dental floss back out once inserted between adjacent teeth.

The term "polyhedron" is in the context of the present invention intended to comprise both various types of polyhedra and prisms.

SHORT DESCRIPTION OF THE DRAWINGS

FIGS. 6a-f show side views of alternative embodiments of floss supporting arms for a dental floss holder according to the invention.

Figure 7:
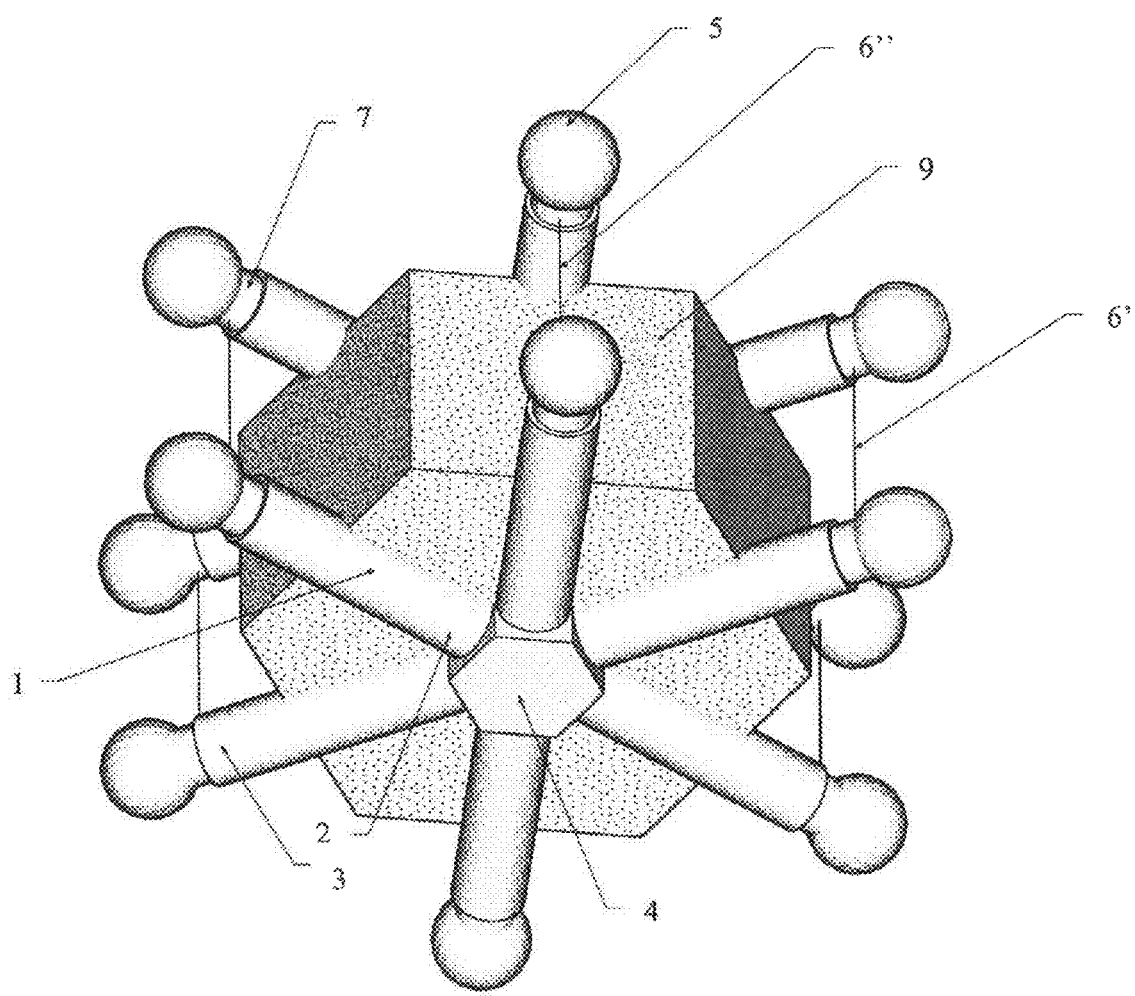

FIG. 7 is a perspective view of an embodiment with a compressible material shown in the space between the floss supporting arms.

DETAILED DESCRIPTION OF EMBODIMENTS OF THE INVENTION

Figure 1:
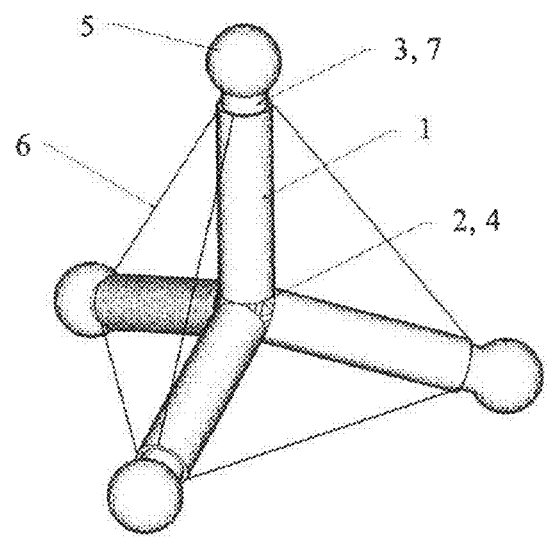
FIG. 1 is a perspective view of a first embodiment of a dental floss holder according to the invention.

A first embodiment of a dental floss holder according to the invention is disclosed in FIG. 1. This specific embodiment has four floss supporting arms 1, wherein each arm has a first end 2 and a second end 3. The first end 2 of each supporting arm 1 is joined to the connecting section 4 (or hub). In this embodiment, the connecting section is formed by the four first ends 2 joined, or connected together. At the second end 3, the supporting arms 1 feature a rounded surface 5 in the form of a knob 5 or ball. The rounded surface ensures that the dental floss holder is comfortable to have in the mouth by avoiding any sharp edges which may hurt or scratch the gums or palate. Each of the supporting arms 1 is connected to a neighboring supporting arm by a string of dental floss 6. In this particular embodiment, each of the supporting arms 1 is connected to three neighboring supporting arms, each connection by a string of dental floss 6. Each string of dental floss is connected to a floss fastening portion 7 at the second end of a supporting arm. The fastening portion 7 is preferably arranged between the rounded surface 5 and the connecting section 4. As can be seen, the multiple strings of dental floss are arranged to constitute the edges of a polyhedron, or more specific in this case, a tetrahedron.

In use, a person may put the present dental floss holder into the mouth and the shape/form of the holder makes it easy to guide the dental floss between the teeth by a combination of chewing on the holder and moving it around by using the tongue. The size of the dental floss holder is such that it can be put into the mouth and used in a comfortable manner.

Figure 2:
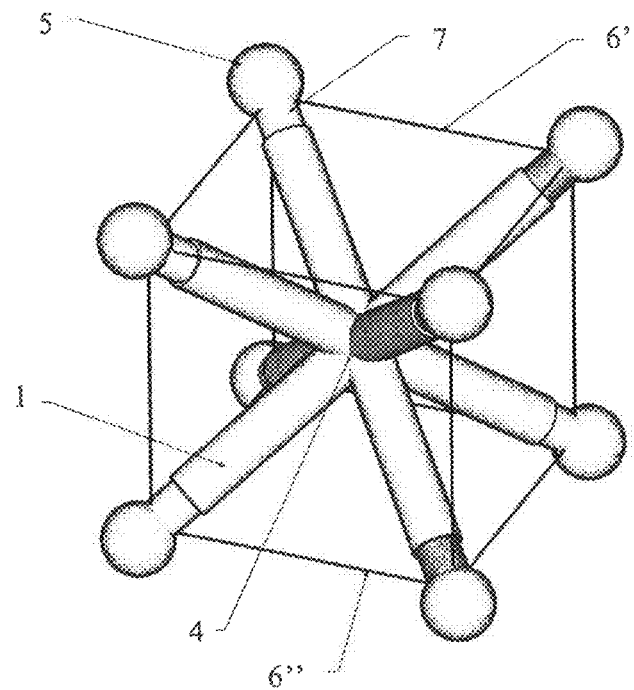
FIG. 2 is a perspective view of a second embodiment of a dental floss holder according to the invention.
Figure 3:
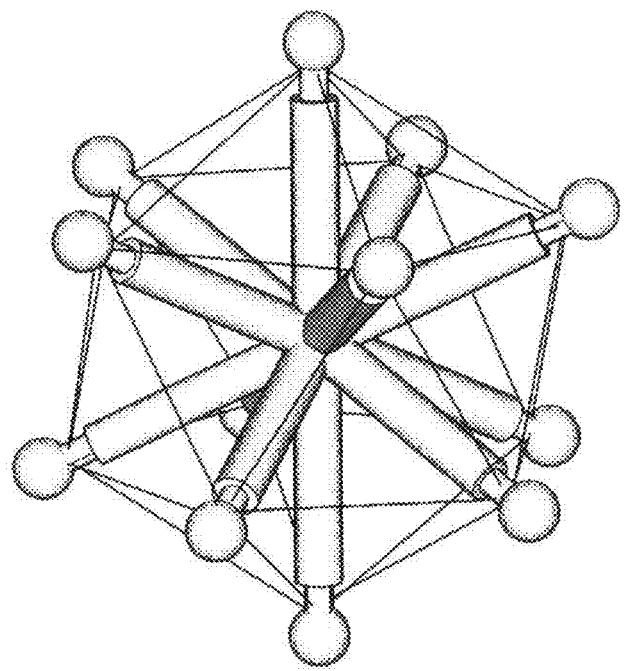
FIG. 3 is a perspective view of a third embodiment of a dental floss holder according to the invention.
Figure 4:
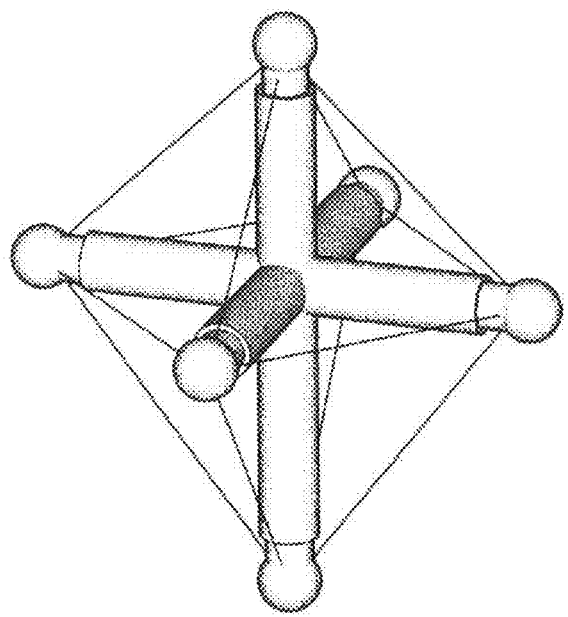
FIG. 4 is a perspective view of a fourth embodiment of a dental floss holder according to the invention.

Further embodiments of the invention are shown in FIGS. 2-4. The main difference between the embodiments is the number of supporting arms and consequently the number of strings of dental floss and thus the geometric shape of the holder.

A dental floss holder comprising eight floss supporting arms 1 is shown in FIG. 2. The multiple strings of dental floss are arranged to constitute the edges of a cube. In this specific embodiment, two strings of dental floss 6', 6" are aligned and arranged on opposite sides of the connecting section 4.

A dental floss holder comprising twelve floss supporting arms 1 is shown in FIG. 3 (the side view hides the four supporting arms which are mirror images of the four supporting arms extending towards the viewer). The multiple strings of dental floss are then arranged to constitute the edges of a polyhedron having 16 faces.

A dental floss holder comprising six floss supporting arms 1 is shown in FIG. 4. The multiple strings of dental floss are arranged to constitute the edges of an octahedron.

Figure 5:
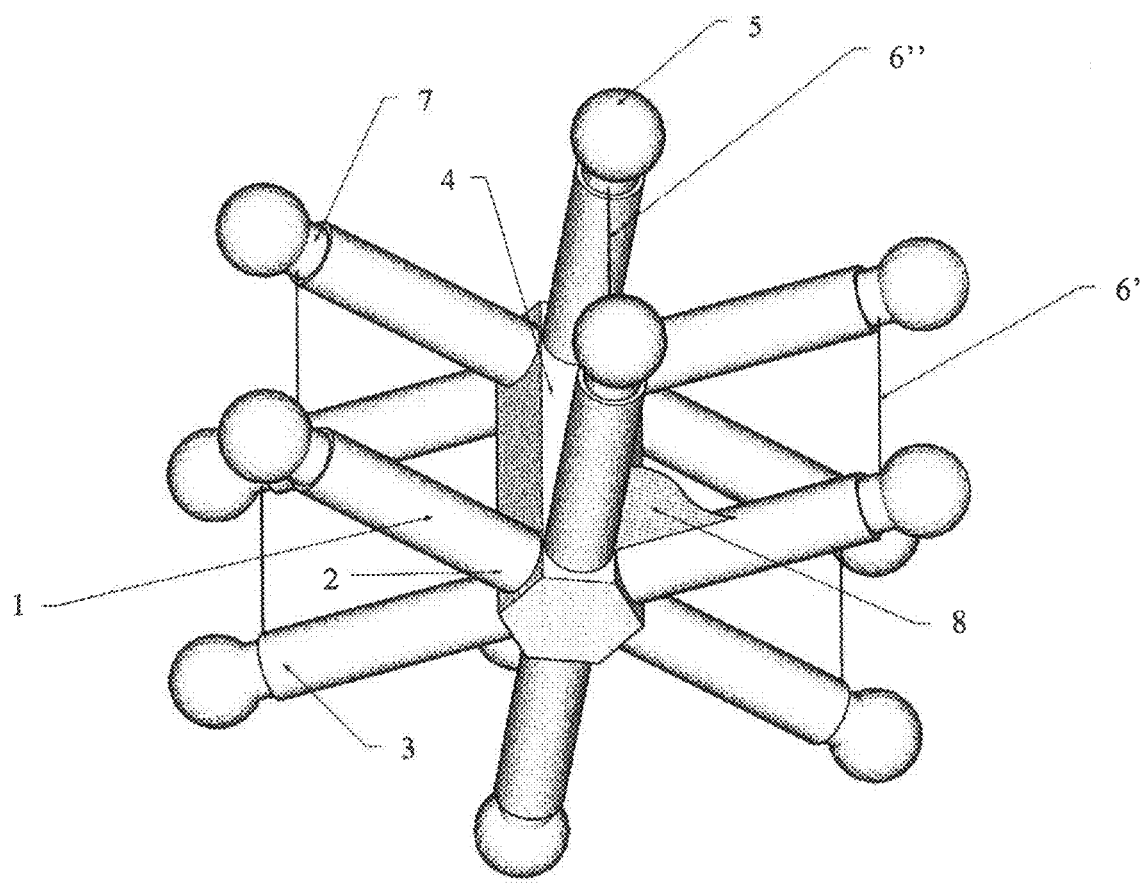
FIG. 5 is a perspective view of a fifth embodiment of a dental floss holder according to the invention.

A dental floss holder comprising twelve floss supporting arms 1 is shown in FIG. 5. A strengthening section 8 is shown arranged between two of the neighboring supporting arms. Such strengthening sections may be arranged between any number of supporting arms provided they do not interfere with the insertion of the strings of dental floss between adjacent teeth.

Figure 6A:
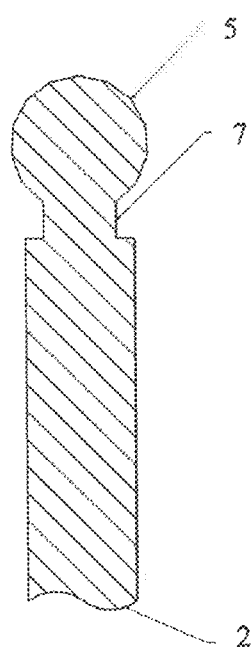
Figure 6B:
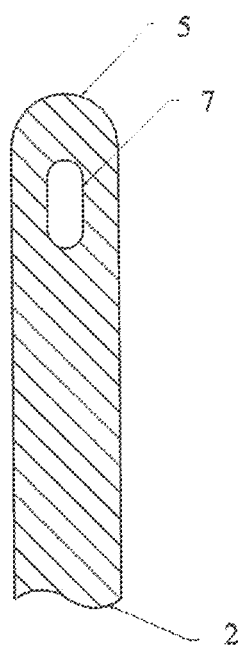
Figure 6C:
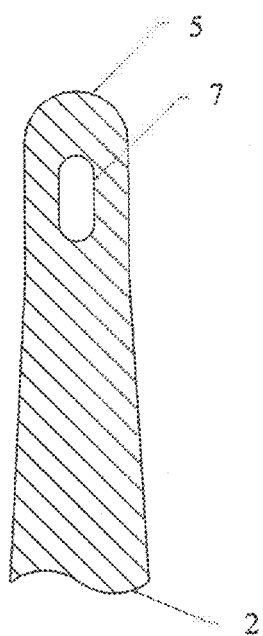
Figure 6D:
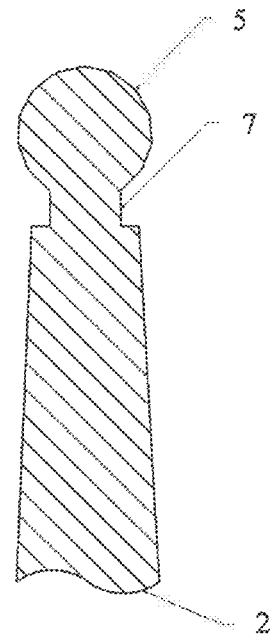
Figure 6E:
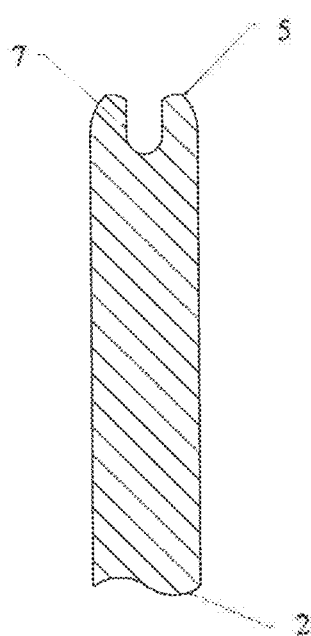
Figure 6F:
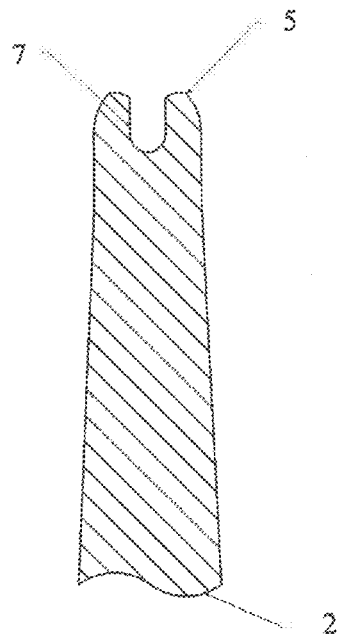

Various alternatives regarding the shape or form of the floss supporting arms are shown in FIGS. 6a-f. The shape/form of the supporting arms may be varied in a multitude of ways, but they should be substantially longitudinal and comprise a fastening portion 7 to which a string of dental floss may be fastened. In the alternatives of FIGS. 6a and 6d, the fastening portion 7 is shown as a slight narrowing of the supporting arm close to the rounded surface 5, while in FIGS. 6b and 6c, the fastening portion 7 is shown as holes. In FIGS. 6e and 6f, the fastening portion 7 is shown as slots. The illustrated fastening portions 7 are especially useful in embodiments where the strings of dental floss may be replaced. In embodiments where the strings of dental floss are permanent (e.g. for single use) they may be attached to the fastening portion 7 by molding, melting, embedding or gluing. When the latter methods for attaching are used the fastening portion is not restricted to any shape or form, and may only denote a position on the supporting arm, at which position a string of dental floss is, or may be, attached.

An alternative feature of a dental floss holder according to one or more embodiments of the invention is shown in FIG. 7. In this case, a compressible material 9 is placed in the space between the strings of dental floss 6, the floss supporting arms and the connecting section, such that the compressible material 9 will help to push the strings of dental floss back out once inserted between adjacent teeth.

The dental floss holder according to one or more embodiments of the invention, excluding the strings of dental floss per se, may be manufactured in any suitable material such as metals and synthetic polymers having the required mechanical properties with regards to strength and flexibility/rigidity. A requirement of such materials is their suitability for oral use by humans. In view of the present disclosure, and known examples of materials used in prior art dental floss holders, the skilled person would easily find a number of materials fulfilling the required properties.

Preferably, the dental floss holder is manufactured in one piece by molding. In such manufacture, the attachment of the strings of dental floss may advantageously be performed during the molding process, or in a subsequent manufacturing step wherein the strings of dental floss are fastened by melting or gluing.

The invention claimed is:

1. A dental floss holder comprising:
    a connecting section; and
    at least four floss supporting arms extending from said connecting section, wherein each of the floss supporting arms has a first end and a second end, wherein the first end is connected to the connecting section, and wherein the second end comprises a floss fastening portion for fastening a string of dental floss,
    wherein the floss fastening portions of the at least four floss supporting arms are configured such that a string of dental floss attached to the floss fastening portions of the at least four floss supporting arms are arranged to form outer edges of a polyhedron shape,
    a string of dental floss
    forming discrete pairs of strings that are aligned and arranged on opposite
    sides of the connecting section, and wherein the connecting section is completely disposed within a volume delimited by the outer edges of the polyhedron shape.

2. A dental floss holder according to claim 1, wherein each of the floss supporting arms are connected to a neighboring floss supporting arm by a discrete string of dental floss among the plurality of discrete strings attached to the floss fastening portions of the floss supporting arms.

3. A dental floss holder according to claim 1, wherein each of the floss supporting arms are connected to each of at least two neighboring floss supporting arms by discrete strings of dental floss among the plurality of discrete strings attached to the floss fastening portions of the floss supporting arms.

4. A dental floss holder according to claim 2, wherein the discrete string of dental floss is spaced apart from the connecting section.

5. A dental floss holder according to claim 1, wherein the second end of the floss supporting arms comprises a rounded surface.

6. A dental floss holder according to claim 1, wherein the polyhedron is selected from the group consisting of: a tetrahedron, a cube, a hexagonal prism, and an octahedron.

7. A dental floss holder according to claim 1, wherein the floss supporting arms are of a substantially equal length.

8. A dental floss holder according to claim 2, wherein the discrete string of dental floss is fastened to the fastening portion by a method selected from the group consisting of: molding, melting, embedding, gluing, winding, tying, and clamping.

9. A dental floss holder according to claim 1, wherein the holder is manufactured as one integrated unit by molding.

10. A dental floss holder according to claim 1, wherein the floss supporting arms are joined together by a strengthening section.

11. A dental floss holder according to claim 1, wherein the floss supporting arms extend from the connecting section to form a polygonal base of a polyhedron where the plurality of discrete strings of dental floss form the faces of the prism.

12. A dental floss holder according to claim 1, wherein a compressible material is placed in a space between the plurality of discrete strings of dental floss, the floss supporting arms and the connecting section, such that the compressible material helps to push a discrete string of dental floss among the plurality of discrete strings back out once inserted between adjacent teeth.

13. A dental floss holder according to claim 1, wherein the first end is a part of the connecting section.

14. A dental floss holder according to claim 1, wherein each of the floss supporting arms are connected to each of at least three, neighboring floss supporting arms by discrete strings of dental floss among the plurality of discrete strings attached to the floss fastening portions of the floss supporting arms.

15. The dental floss holder according to claim 1, wherein the first end of each floss supporting arm is directly connected to the same connecting section.

\* \* \* \* \*